(12) United States Patent
Lunt (10) Patent No.: US 9,160,800 B1
(45) Date of Patent: *Oct. 13, 2015

(54) INTEGRATING WEB SERVICES WITH A CONTENT ITEM

(71) Applicant: Google Inc., Mountain View, CA (US)

(72) Inventor: Eric M. Lunt, Barrington, IL (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,497

(22) Filed: Jul. 15, 2013

Related U.S. Application Data (63) Continuation of application No. 11/952,702, filed on Dec. 7, 2007, now Pat. No. 8,504,711.

(60) Provisional application No. 60/869,674, filed on Dec. 12, 2006.

(51) Int. Cl.
  *G06F 15/16* (2006.01)
  *H04L 29/08* (2006.01)

(52) U.S. Cl.
  CPC ..................... *H04L 67/16* (2013.01)

(58) Field of Classification Search
  CPC .................................................. G06F 17/308
  USPC ............................. 709/201, 229, 231; 725/47
  See application file for complete search history.

(56) References Cited

U.S. PATENT DOCUMENTS

| | | | |
|---|---|---|---|
| 6,285,985 B1 | 9/2001 | Horstmann | |
| 6,366,933 B1 | 4/2002 | Ball et al. | |
| 6,564,380 B1 | 5/2003 | Murphy | |
| 6,738,803 B1 * | 5/2004 | Dodrill et al. | 709/218 |
| 6,807,558 B1 | 10/2004 | Hassett et al. | |
| 6,917,960 B1 | 7/2005 | Decasper et al. | |
| 7,000,238 B2 * | 2/2006 | Nadler et al. | 719/330 |
| 7,018,295 B2 | 3/2006 | Sakaguchi et al. | |
| 7,117,504 B2 * | 10/2006 | Smith et al. | 719/328 |
| 7,337,214 B2 | 2/2008 | Douglass et al. | |
| 7,349,980 B1 * | 3/2008 | Darugar et al. | 709/238 |
| 7,529,805 B2 * | 5/2009 | Martinez et al. | 709/211 |
| 7,634,535 B2 | 12/2009 | Watson | |
| 7,640,184 B1 | 12/2009 | Lunt | |
| 2001/0047297 A1 | 11/2001 | Wen | |
| 2002/0178244 A1 * | 11/2002 | Brittenham et al. | 709/223 |

(Continued)

OTHER PUBLICATIONS

Connected: An Internet Encyclopedia, 5.2 Base64 Content-Transfer-Encoding, Freesoft.org, Dated Oct. 4, 2004, 3 pages.

(Continued)

*Primary Examiner* — David Lazaro
*Assistant Examiner* — Marie Georges Henry
(74) *Attorney, Agent, or Firm* — Patent Law Works LLP (57) ABSTRACT

Methods, systems, and apparatus, including computer program products, for integrating web services into a content item are disclosed. In one aspect, a method includes the actions of receiving a request for web services from a publisher, retrieving the web services file that corresponds to the web services requested from the location provided, identifying the web services contained in the web services file, retrieving a content item from the publisher, integrating the content item and the web services defined by the web services file to create augmented content, receiving a request for augmented content, and providing the augmented content. Other implementations of this aspect include corresponding systems, apparatus, and computer program products.

20 Claims, 3 Drawing Sheets

(56) References Cited

U.S. PATENT DOCUMENTS

| | | |
|---|---|---|
| 2003/0033209 A1 | 2/2003 | Minear et al. |
| 2003/0097453 A1 | 5/2003 | Fuchigami et al. |
| 2004/0103195 A1* | 5/2004 | Chalasani et al. ............ 709/226 |
| 2004/0215718 A1 | 10/2004 | Kazmi et al. |
| 2005/0038717 A1 | 2/2005 | McQueen et al. |
| 2005/0165615 A1 | 7/2005 | Minar |
| 2005/0188078 A1 | 8/2005 | Kotzin et al. |
| 2006/0026113 A1 | 2/2006 | Omoigui |
| 2006/0095507 A1 | 5/2006 | Watson |
| 2006/0230021 A1 | 10/2006 | Diab et al. |
| 2006/0248209 A1 | 11/2006 | Chiu et al. |
| 2006/0288011 A1 | 12/2006 | Gandihi et al. |
| 2007/0038516 A1 | 2/2007 | Apple et al. |
| 2007/0094081 A1 | 4/2007 | Yruski et al. |
| 2007/0168483 A1 | 7/2007 | Lunt et al. |
| 2008/0034058 A1* | 2/2008 | Korman et al. ............... 709/217 |
| 2008/0104044 A1 | 5/2008 | Kardamilas et al. |
| 2008/0141117 A1 | 6/2008 | King et al. |
| 2009/0006201 A1 | 1/2009 | Faseler |
| 2009/0254635 A1 | 10/2009 | Lunt |

OTHER PUBLICATIONS

Feedburner, About Syndication, RSS, and Other Web-Altering Chemicals, FeedBurnerconn, dated Jun. 2004, 2 pages.

Heather Green, All the News You Choose-on One Page, News Analysis & Commentary, dated Oct. 25, 2004, 1 page.

Heintz, Tschabitscher, How Base64 Encoding Works, About, Inc., dated Oct. 4, 2004, 3 pages.

John Walker, Base64 Encode and Decode Base 64 Files, Fourmila.ch, dated Feb. 20, 2011, 2 pages.

Python Library References, 12. 12 Base64-Encode and Decode MIME Base64 Data, Python.org, dated May 20, 2004, 2 pages.

Wikipedia, RSS (Protocol), Wikipedia The Free Encyclopedia, dated Nov. 11, 2004, 2 pages.

* cited by examiner

INTEGRATING WEB SERVICES WITH A CONTENT ITEM

CROSS-REFERENCE TO RELATED APPLICATIONS

This application is a Continuation of and claims priority under 35 U.S.C. §120 to U.S. patent application Ser. No. 11/952,702, titled "INTEGRATING WEB SERVICES WITH A CONTENT ITEM" filed Dec. 7, 2007, which claims the benefit under 35 U.S.C. §119(e) of U.S. Patent Application No. 60/869,674, titled "MECHANISM FOR INTEGRATING WEB SERVICES ACTIONS AND META-DATA WITH ANY CONTENT ITEM IN ANY RSS FEED OR WEB PAGE" filed Dec. 12, 2006, the contents of which are all incorporated by reference herein.

BACKGROUND

This specification relates to web services.

The Internet is a primary source of information for many users. Users can access websites that provide updated information on news, sports and entertainment as well as websites that may provide more niche information. Many of these websites are updated on regular basis and therefore users can visit these websites regularly to view the latest updates. Similarly, users can view the information through content aggregators that gather new content from user specified websites and present the information from the websites in a common display. These aggregators allow users to view the updated content from different websites without having to visit each of the websites individually. The updated content, for example, can be contained in a really simple syndication feed provided by the publishers of the websites.

SUMMARY OF THE INVENTION

In general, one aspect of the subject matter described in this specification can be embodied in methods that include the actions of receiving a request for web services from a publisher; retrieving the web services file that corresponds to the web services requested from the location provided, identifying the web services contained in the web services file, retrieving a content item from the publisher, integrating the content item and the web services defined by the web services file to create augmented content, receiving a request for augmented content, and providing the augmented content. Other implementations of this aspect include corresponding systems, apparatus, and computer program products.

These and other implementations can optionally include one or more of the following features. The identifying the web services can include identifying a name, a description, and instructions for generating the web services. The request for web services can include a request to include a link that will invoke an action related to the content item with the content item. The request for web services can include a request to include metadata with the content item, the metadata further describing the content item. The web services can be static or dynamic. The method can also include the step of providing the web services to the publisher for inclusion in a website.

Particular implementations of the subject matter described in this specification can be implemented so as to realize one or more of the following advantages. One advantage realized is the inclusion of web services in a content item without manipulating the content management system used to create the content. Another advantage realized is the inclusion of web services on a website without manipulating the content management system used to create the content.

The details of one or more implementations of the subject matter described in this specification are set forth in the accompanying drawings and the description below. Other features, aspects, and advantages of the subject matter will become apparent from the description, the drawings, and the claims

BRIEF DESCRIPTION OF THE DRAWINGS

Like reference numbers and designations in the various drawings indicate like elements.

DETAILED DESCRIPTION OF THE PREFERRED EMBODIMENTS

Figure 1A:
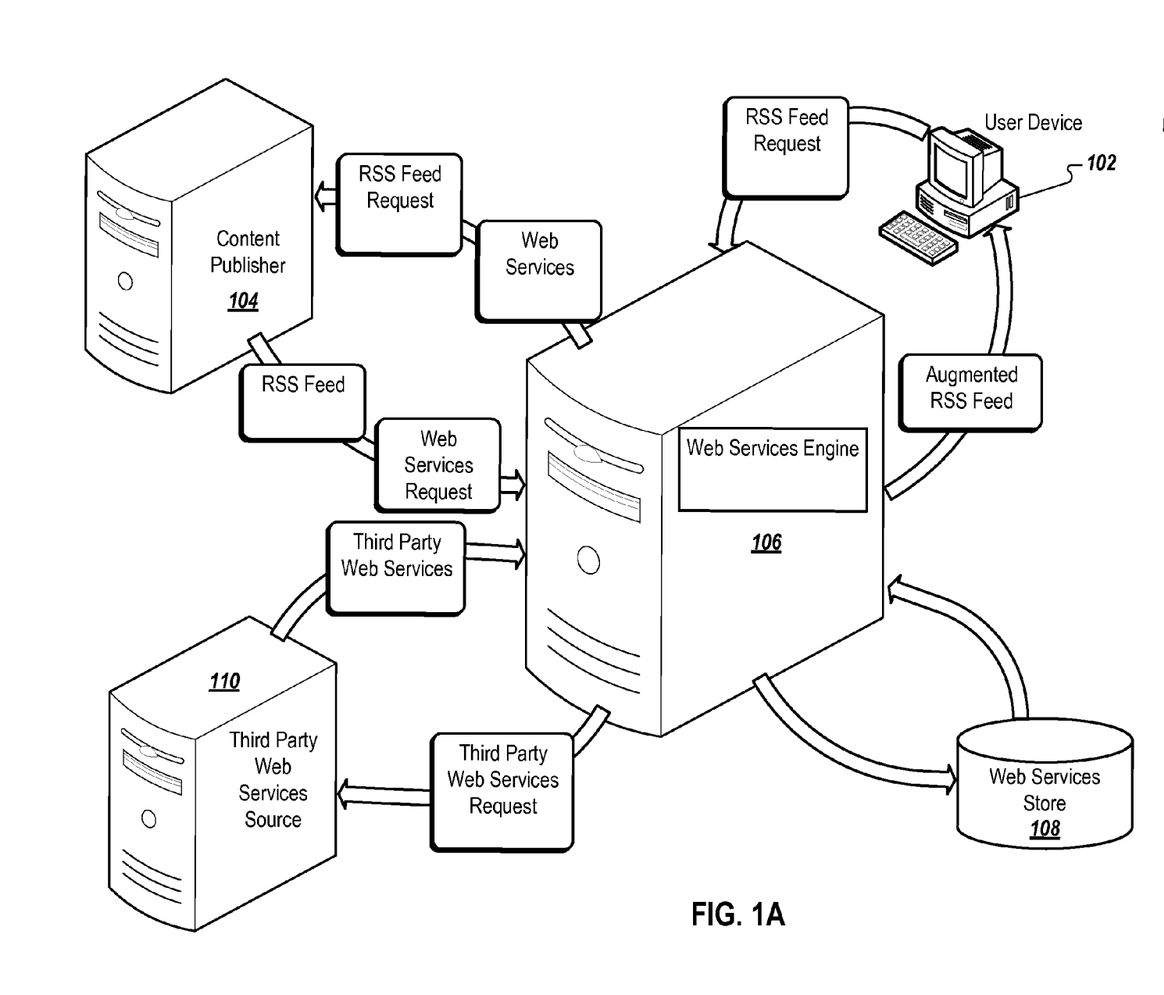
FIG. 1A is a block diagram illustrating a web services engine integrated into a content distribution system.

FIG. 1 is a block diagram illustrating a web services engine 106 integrated into a content distribution system 100. In some implementations a user device 102 connects to a content publisher 104 to request online content. The content publisher 104 can offer a variety of content in a variety of formats. For example, the content publisher can offer content related to news events, entertainment, music, literature, etc. in the form of articles, web logs, podcasts, or any other form for delivering content. The user device 102 can connect to the content publisher 102 through any appropriate communications method including a local area network, wide area network, or the Internet to access the content to view the content on the website.

Figure 1B:
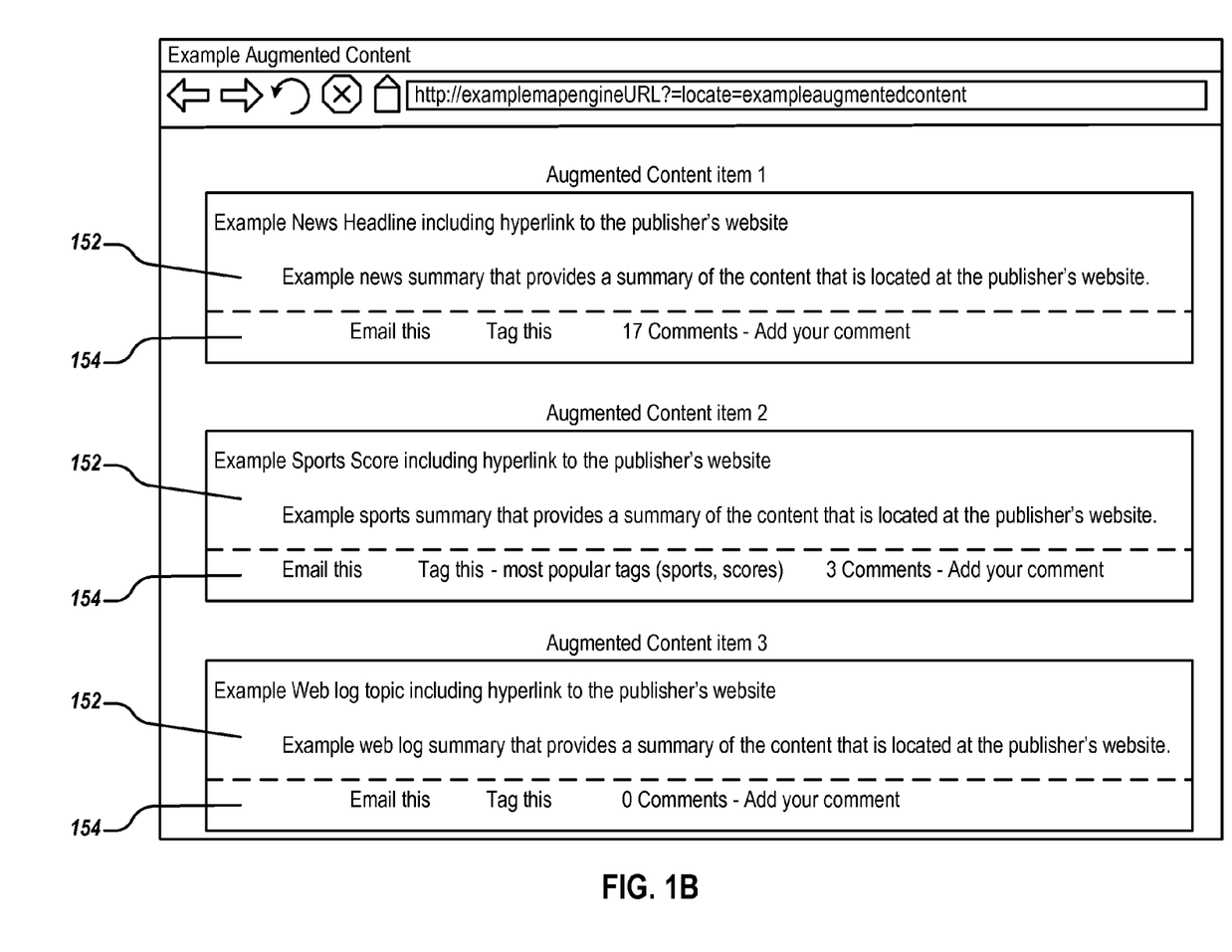
FIG. 1B is an example screen shot of a web browser presenting augmented content items.

In addition to offering content on websites, content publishers 104 can offer Really Simple Syndication ("RSS") feeds for their content. RSS feeds make content from a website available to user devices 102 through the use of RSS aggregators. The RSS aggregator can be configured on the user device 102 or through an online RSS aggregator (e.g., Google Reader). The RSS aggregator polls a list of websites that the user has specified and retrieves the new RSS feed content 152 that has been added to the website since the aggregator last polled the website. The RSS aggregator displays the retrieved information from the list of websites on the user device 102, as shown in FIG. 1B. Thus, the RSS aggregator allows a user to monitor a number of websites for new content without having to visit each of the individual websites on a regular basis and is an efficient way for content publishers 104 to disseminate information to users.

In addition to displaying new content, a link is generally provided in the RSS feed so that a user can visit the website providing the RSS feed. The user can click on the link in the RSS feed and be directed to the content publisher's website to read the full version of the content, learn more information related to the content, or take other actions related to the content, as discussed in the following paragraphs.

Generally, the website hosting the RSS feed will provide a more detailed version of the content than is presented in the RSS feed. For example, many RSS feeds offer only a summary or a portion of the entire content in the RSS feed due to character limits or other space constraints. Therefore, by clicking on the link for the website, the user can view the full version of the content.

Additionally, the website may offer services in the form of providing more information related to the content that is not included in the RSS feed. For example, the website may provide the service of providing text indicating the number of comments that have been posted in response to an article. Similarly, the website may offer the service of displaying tags that have been used to categorize the content on a social bookmarking service (e.g., del.icio.us).

Further, the website may offer services in the form of actions that can be taken related to the content. For example, a link can be provided on the website that allows a user to email a link to the content. Similarly, a link can be provided in the website that directs the user device 102 to a website, e.g., del.ici.ous, where the user can bookmark the content. In addition to directing the user to the website, fields in the target website can be automatically filled for the user.

While there are many web services that a content publisher 104 can include on a website, when these services are not included in an RSS feed and, therefore, are not utilized as frequently by the users. For example, if the content publisher 104 is providing an RSS feed and the user device 102 is not directed to the content publisher's website by clicking on the link in the RSS feed, these added web services are unutilized. Therefore, it is advantageous to include these web services 154 in the RSS feed 152, as shown in FIG. 1B, so that users viewing new content through an RSS aggregator can still use web services 154 without first being directed to the content publisher's website.

Content publishers 104 can include the web services, which are also known as FeedFlare, in the RSS feed by utilizing a web services engine 106 to integrate the web services into the RSS feed. The content publisher 104 selects the web services to be included with the RSS feed and provides the URL of the RSS feed for the web services engine 106. The web services can be selected from a catalog of web services located in the web services store 108 associated with the web services engine 106. Alternatively, the web services can be located on a third party web services source 110 or the web services can be provided by the content publisher 104.

If the web services are selected from a catalog of web services hosted by the web services engine 106, then a user interface can be provided that allows the content publisher 104 to select from a list of available web services. For example, the content publisher 106 can sign into an account on the web services engine 106 and view a list of available web services for the feed. The content publisher 106 selects the web services to be included in the RSS feed, for example, by selecting a check box associated with the web services selection. In response to the selection of the check box, the web services engine 106 will include the web services with the RSS feed for any subsequent requests for content by user devices 102. In some implementations, the selection of the check box can identify a URL associated with the web services and instruct the web services engine 106 to retrieve a web services file, or some other web services data, such as a serialized data stream, that contains the web services from the URL specified.

If the web services to be included in the feed are hosted by a third party web services source 112, then the content publisher 104 provides a URL that identifies the location of the web services file to the web services engine 106. The web services engine 106 retrieves the web services from the URL provided and integrates the web services with the feed to create an augmented RSS feed that will be provided in response to subsequent requests for content by user devices 102. Similarly, if the content publisher 104 is the source of the web services, then the content publisher 104 provides the URL associated with the location of the web services file. The web services engine 106 retrieves the web services file from the URL and integrates it into the RSS feed.

In addition to providing the URL identifying the location of the web services file to be integrated to the feed, the content publisher 104 also provides the feed content to the web services engine 106. The content publisher 104 can provide the feed content to the web services engine 106 by providing the URL of the file containing the feed content items (e.g., the feed file). The web services engine 106 can retrieve the feed file from the content publisher's website on a periodic basis (e.g., every thirty minutes). Alternatively, the web services engine 106 can be configured to retrieve the feed file from the content publisher's website in response to a request for content from a user device 102. When the web services engine 106 retrieves the feed file, it also retrieves the web services file from the URL associated with the web services file and integrates the feed file and web services file to create an RSS feed having augmented content.

The augmented RSS feed content can be maintained on the web services engine 106 or a data store accessible by the web services engine. Maintaining the augmented content local to the web services engine enables the web services engine to periodically perform the retrieval of both the web services and the RSS feed content rather than performing the retrieval in response to each request for content from a user device 102.

To insure user devices 102 receive an augmented RSS feed, including the web services from the web services engine 106, rather than the original RSS feed from the content publisher's website, the content publisher 104 can redirect all requests for the RSS feed to the URL associated with the augmented RSS feed located on the web services engine 106. Therefore, RSS aggregators are not required to identify the location of the augmented RSS feed and any request for content will be routed through the web services engine 106. Alternatively, user devices 102 can be configured to visit the URL associated with the augmented RSS feed directly, rather than being redirected from the publisher's website.

In some implementations, the web services file is a descriptor file that describes the web services to be integrated into the RSS feed. The descriptor file has a content management independent file format (e.g., XML format) so that the web services can be integrated with a feed from any content management platform. The descriptor file generally contains three pieces of information, a name for the web services, a description of the web services, and instructions for generating the web services.

The name of a web service is an identifier for the web service that is contained in the web services file. The description is a description of the web service that is in the web services file. The description is provided by the web services creator and can include encoded html so that the description can be defined with reference to a URL. The name and the description are used by the web services engine 106 to provide a title and description of the web services that are contained in the web services file. The title and description can be presented by the web services engine 106 to facilitate selection of web services by the content publisher 104. For example, a content publisher 104 can examine the title and the description of the web services in a list of available web services and select the web services based on the title and description.

In some implementations, the instructions for generating web services are system independent (e.g., XML) instructions that are used by the web services engine 106 to render the web services in the RSS feed. The web services instructions can define static web services or dynamic web services.

Static web services are web services that once created, do not change over time. For example, "email this" is generally a static web service because the "email this" text that is included in the feed is generally defined in the instructions and is not being retrieved from a secondary source. Additionally, the URL associated with the content will generally not change, so the web service remains constant once it is created. For example, the publisher 104 provides the link to the content with the RSS feed. The web services engine 106 identifies this URL in the RSS feed and includes it as the link to be emailed in the "email this" web service.

In some implementations, the web services can be dynamic. The dynamic web services are web services that are defined by variables that are resolved by the web services engine 106 and can change over time. Dynamic web services are generally defined by information located at a reference URL that provides the details of the web services when it is called. "Tag it" is an example of a dynamic web service because the text associated with the web service is defined in part by the tags associated with the item at the book marking site (e.g., del.icio.us). To create dynamic web services, the web services engine 106 requests the information for creating the web services from the reference URL. For example, the tags associated with an RSS feed item that can be included in the web service can be located at the reference URL. The web services engine 106 can retrieve the tag information from the reference URL and integrate the information into the web service. Since the tags changes as users tag the item, the information retrieved from the reference URL changes, that, in turn, changes the web service.

For example, if there are no tags associated with a feed item, then the information retrieved from the reference URL will indicate that there are no tags associated with the item. Therefore, the web service may only display "tag it" in the RSS feed. However, after several users have tagged the item, the information retrieved from the reference URL may provide a response that identifies the top tags for the item that should be included in the web service. Therefore, the web service can display the top tags that have been associated with the item. For example, "top tags for this item blog, football" might be displayed with an RSS item that has the tags "blog" and "football" associated with it on the book marking service. The web services engine 106 retrieves the new information from the reference URL on a periodic basis and updates the web services file with the new information. Alternatively, the web services engine can update web services on each request for content from a user device 102.

"Tag it" is an example of dynamic web services that are dependent on information associated with the feed item. However, web services can also be dynamic without reference to the feed item. A content publisher 106 can select web services that retrieve a random object from a path or service to be included in the RSS feed. For example, the web services file can include instructions to retrieve a random photo from a location in response to each user RSS feed request. Thus, each time a user retrieves the RSS feed, the user receives a newly selected random photo. Similarly, application programming interfaces (API) can be used in the web services file to request services from program applications to include in the web services. For example, web services can be created using an API for a photo service (e.g., Google's Picasa) that serves a random photo from a specified user's account in response to each RSS feed request.

The web services engine 106 can be configured to serve the feed item and the web services asynchronously so that presentation of the feed item is not delayed by the rendering of the web services. For example, if a user device 102 requests augmented content from the web services engine 106 and the web services references a URL for information required to render the web services, it is possible that there will be a delay between the request for the information and the server delivering the information. Therefore, if a delay is detected by the web services engine 106, the web services engine can render the feed item first and then render the web services item on a subsequent page load. This prevents the RSS feed from being delayed due to a delay in providing the web services.

The web services associated with a feed item can define an action that the user can take regarding the item or additional information about the item that can be presented to the user. "Email this" is an example of an action web service that allows action to be taken regarding the item. The action that is taken is emailing the title of the item and a link to the item to the addressee that the user selects. Similarly, "tag it" is another example of an action that can be taken regarding a feed item. The action that is taken is adding the item to the user's list of tagged items on a social book marking website (e.g., del.icio.us). In both instances, when the web services are selected the user device 102 is directed to the host of the service that is facilitating the action (e.g., gmail, del.icio.us, etc) so that the action can be completed by the user.

An example of information web services is the "comments count" web service. The "comments count" web service displays the number of comments that are associated with the feed item. For example, if a feed item is a blog posting that allows reader comments about the post, then the "comments count" web service identifies and displays the number of comments that have been entered on the content publisher's website in response to the posting. Therefore, the user has access to the comment count without having to visit the content publisher's website.

The web services engine 106 can also be configured to provide web services to the content publisher 104 for inclusion on the content publisher's website. For example, the content publisher 104 can request web services from the web services engine 106 and also select an option to have the web services included on their website. In response, the web services engine 106 will provide the content publisher 104 with a content management independent script (e.g., JavaScript) that renders the web services on the content publisher's website.

For example, a content publisher 104 can select an option to have the "email this" web service included on the content publisher's website. In response, the web services engine 106 will create a portion of code (e.g., JavaScript) that will be provided to the content publisher's website. The content publisher's website will execute the portion of code when the web page is rendered resulting in the inclusion of the "email this" web service on the content publisher's website.

Figure 2:
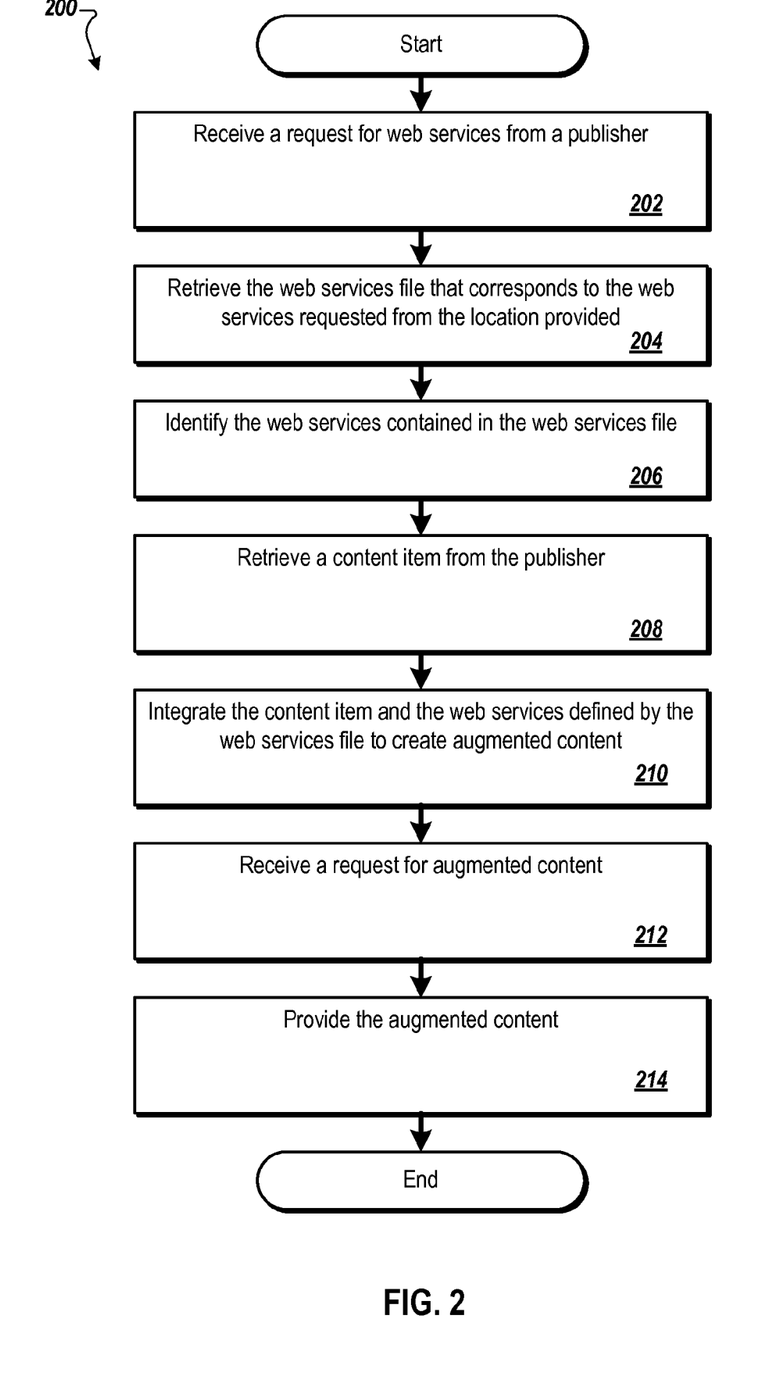
FIG. 2 is a flow chart illustrating a process for integrating web services with a content item.

FIG. 2 is a flow chart illustrating a process 200 for integrating web services with a content item. The process 200 begins by receiving a request for web services from a publisher (202). The request for web services can be initiated, for example, by selecting web services from a list of web services that are available on the web services engine 106 or in a web services store 108 connected to the web services engine. Alternatively, the request can be initiated by supplying the web services engine with a URL that identifies the location of the web services that the publisher is requesting.

The process 200 continues by retrieving the web services file that corresponds to the web services requested from the location provided (204). The web services file can be retrieved, for example, from a web services store 108 connected to the web services engine 106. Alternatively, the web services can be retrieved from a URL associated with a third party web services source 110 or the content publisher 104.

Next the process 200 identifies the web services contained in the web services file (206). Each web services file is created in a content management independent format (e.g., XML) and contains a title, a description, and instructions for generating the web services. The title and the description can be presented, for example, by the web services engine 106 to identify the web services associated with the web services file. The instructions are used, for example, by the web services engine 106 to generate the web services. The instructions can identify static web services or dynamic web services. When the instructions identify dynamic web services, the variables can be resolved by the web services engine by retrieving information from URLs associated with the web services variables.

The process 200 continues by retrieving a content item from the publisher (208). The content item can be, for example, an RSS feed item retrieved form the content publisher's website. The content item can be retrieved, for example, by the web services engine 106. The content item can be retrieved on a periodic basis, or alternatively, in response to a request for augmented content by a user device 102.

The process 200 continues by integrating the content item and the web services defined by the web services file to create augmented content (210). The content item and web services can be integrated, for example, by the web services engine 106. The web services engine 106 can retrieve the feed item from the content publisher 104 periodically or on each request for content from a user device 102. The web services engine 106 can integrate the web services with the feed to create an augmented feed that includes the web services.

Next, the process 200 receives a request for augmented content (212). The request can be received, for example, from a user device 102. The user device 102 can request the content directly from the web services engine 106. Alternatively, the user device 102 can request the content from the content publisher 104 and be redirected to the web services engine 106 by the content publisher 104.

The process 200 continues by providing the augmented content (214). The augmented content can be provided, for example, to the user device 102.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, by one or more computing devices, a request for a web service from a publisher, the request specifying a location of a web service file for the web service;
retrieving, by at least one of the one or more computing devices, the web service file that corresponds to the web service from the location specified in the request by the publisher;
receiving, by at least one of the one or more computing devices, a web feed that includes a feed item;
integrating, by at least one of the one or more computing devices, the web feed and the web service defined by the web service file to create an augmented web feed, the augmented web feed including dynamic content that is determined based on current information associated with the feed item; and
providing, by at least one of the one or more computing devices, the augmented web feed in response to a user request for the web feed.

2. The method of claim 1, further comprising:
receiving, by at least one of the one or more computing devices, a comment on the feed item from a first user;
updating, by at least one of the one or more computing devices, the augmented web feed by modifying the dynamic content based on the comment; and
providing, by at least one of the one or more computing devices, the updated web feed to a second user that requests for the web feed.

3. The method of claim 1, wherein retrieving the web service file comprises retrieving a file that includes instructions for generating the web service.

4. The method of claim 3, wherein the instructions define whether the web service is a static web service or a dynamic web service.

5. The method of claim 1, wherein the augmented web feed includes static content that remains constant over time.

6. The method of claim 1, wherein the web service defines an action that a user takes on the feed item, and wherein the dynamic content is updated based on the action taken by the user.

7. The method of claim 1, further comprising:
detecting, by at least one of the one or more computing devices, a delay in a rendering of the web service; and
providing, by at least one of the one or more computing devices, the feed item and the web service asynchronously in response to the user request.

8. A system comprising:
a processor; and
a memory storing instructions that when executed cause the system to:
receive a request for a web service from a publisher, the request specifying a location of a web service file for the web service;
retrieve the web service file that corresponds to the web service from the location specified in the request by the publisher;
receive a web feed that includes a feed item;
integrate the web feed and the web service defined by the web service file to create an augmented web feed, the augmented web feed including dynamic content that is determined based on current information associated with the feed item; and
provide the augmented web feed in response to a user request for the web feed.

9. The system of claim 8, wherein the instructions cause the system to also:
  receive a comment on the feed item from a first user;
  update the augmented web feed by modifying the dynamic content based on the comment; and
  provide the updated web feed to a second user that requests for the web feed.

10. The system of claim 8, wherein the instructions cause the system to retrieve the web service file by retrieving a file that includes instructions for generating the web service.

11. The system of claim 10, wherein the instructions for generating the web service define whether the web service is a static web service or a dynamic web service.

12. The system of claim 8, wherein the augmented web feed includes static content that remains constant over time.

13. The system of claim 8, wherein the web service defines an action that a user takes on the feed item, and wherein the dynamic content is updated based on the action taken by the user.

14. The system of claim 8, wherein the instructions cause the system to also:
  detect a delay in a rendering of the web service; and
  provide the feed item and the web service asynchronously in response to the user request.

15. A computer program product comprising a non-transitory computer usable medium including a computer readable program, wherein the computer readable program when executed on a computer causes the computer to:
  receive a request for a web service from a publisher, the request specifying a location of a web service file for the web service;
  retrieve the web service file that corresponds to the web service from the location specified in the request by the publisher;
  receive a web feed that includes a feed item;
  integrate the web feed and the web service defined by the web service file to create an augmented web feed, the augmented web feed including dynamic content that is determined based on current information associated with the feed item; and
  provide the augmented web feed in response to a user request for the web feed.

16. The computer program product of claim 15, wherein the computer readable program when executed on the computer causes the computer to also:
  receive a comment on the feed item from a first user;
  update the augmented web feed by modifying the dynamic content based on the comment; and
  provide the updated web feed to a second user that requests for the web feed.

17. The computer program product of claim 15, wherein retrieving the web service file comprises retrieving a file that includes instructions for generating the web service.

18. The computer program product of claim 17, wherein the instructions define whether the web service is a static web service or a dynamic web service.

19. The computer program product of claim 15, wherein the augmented web feed includes static content that remains constant over time.

20. The computer program product of claim 15, wherein the web service defines an action that a user takes on the feed item, and wherein the dynamic content is updated based on the action taken by the user.

* * * * *